Patented Sept. 24, 1935

2,015,446

UNITED STATES PATENT OFFICE 2,015,446

STABLE DI-CALCIUM SILICATE REFRACTORY COMPOSITION

Arthur Tregoning Cape and Kiel B. Bowman, Massillon, Ohio, assignors, by mesne assignments, to Republic Steel Corporation, Youngstown, Ohio, a corporation of New Jersey No Drawing. Application March 9, 1931, Serial No. 521,383

3 Claims. (Cl. 106—9)

This invention relates in general to refractories, and has reference more particularly to the preparation of refractory materials which retain their refractoriness and stability at temperatures higher than those usually employed in ferrous metallurgical processes.

In general, the addition of a base to an acid, or an acid to a base, effects a lowering of the melting or fusing point of the mixture. In the particular case of the addition of lime (CaO), in amounts of more than 25%, to silica ($SiO_2$), the melting point is rapidly lowered until an eutectic is formed, which melts at a temperature of about 1436° C. With further additions of lime, the melting point of the mixture is increased until a compound of the formula $CaO.SiO_2$ is formed. As the lime is still further increased, the melting point is depressed until a second eutectic is formed containing about 54% of lime. A sharp rise in the melting point then ensues which reaches a maximum of about 2130° C. for a compound corresponding to the formula $2CaO.SiO_2$, commonly known as di-calcium silicate and containing 65% lime and 35% silica. With further additions of lime, a slight lowering of the melting point takes place and then an increase to the extremely high melting point of lime (about 2572° C.).

It is obvious that lime-silicates containing lime in amounts of 65% and more by weight would be admirably adapted for use as refractories, in the form of bricks, muffles, furnace bottoms, etc. Unfortunately, however, di-calcium silicate exists in three crystalline forms, namely, in the alpha, beta and gamma forms. The alpha form is stable from 1420° C. to fusion at 2130° C. and the beta form is stable from 675° C. to 1420° C. The gamma form is stable below 675° C. On cooling, the inversion from the beta form to the gamma form is accompanied by a ten per cent increase of volume, which shatters or decrepitates the material.

The stability of di-calcium silicate at high temperatures is readily recognized in the fact that the lumps of lime found floating for long periods in a basic open-hearth slag are covered with a layer of di-calcium silicate which prevents the ready solution of the lime in the slag.

As a result of our investigations, we have discovered a method of stabilizing di-calcium silicate and lime-silicates higher in lime, which has enabled us to utilize these silicates as refractories, thereby taking advantage of their high resistance to corrosion and their extreme refractoriness and hardness at high temperatures. We have prepared bricks of di-calcium silicate and have floated them in open-hearth slags for periods up to half and hour without appreciable corrosion or fluxing taking place.

We accomplish this stabilization of lime-silica mixtures high in lime by incorporating therewith relatively small amounts of a substance, which, for want of a more apt term, we prefer to call a "mineralizer", and which serves to retard or prevent the inversion or crystalline change, which has been described.

Mineralizers which we have found to be well adapted for the purpose of preventing inversion of di-calcium silicate are borates and phosphates. These borates or phosphates are preferably incorporated with the lime-silica mixtures in amounts up to 10% by weight of the mixture, a concentration of as low as one-half of one per cent being sufficient to ensure stabilization of di-calcium silicate. These mineralizers also serve as effective bonding agents without appreciably lowering the melting point of the mixture. Suitable borates are sodium and calcium borates, and suitable phosphates are tri-calcium phosphate and minerals such as apatite.

In making refractory bricks from these materials, the mixture of lime, silica and mineralizer, with or without additional bonding agents are molded to the desired form and fired in the usual manner.

We have prepared many samples of refractories from these materials and their stability is evidenced by long periods of standing at room temperatures without signs of decrepitation.

The invention, in its broadest aspect, is intended to comprehend refractories containing lime and silica, in which the lime varies from about 60% to about 95% by weight of the refractory composition, and the mineralizer varies from small fractions of 1% up to amounts which will not appreciably lower the melting point of the refractories, that is to say, up to about 10% by weight of the refractory composition.

We claim:

1. A stabilized silicate refractory substance containing between about 65% and 95% of lime, silica combined with a portion of the lime in the form of di-calcium silicate and between about ½% and 10% of a phosphate capable of stabilizing the di-calcium silicate.

2. A stabilized refractory substance containing between about 65% and 95% of lime, silica not exceeding 35%, the silica combined with a portion of the lime in the form of di-calcium silicate, and between about ½% and about 10% of a phosphate.

3. A refractory composition comprising about 65% and 95% of lime, silica combined with a portion of the lime in the form of di-calcium silicate and between about ½% and 10% of a phosphate.

ARTHUR TREGONING CAPE.
KIEL B. BOWMAN.